US011212285B2

(12) United States Patent
Hydell et al.

(10) Patent No.: US 11,212,285 B2
(45) Date of Patent: *Dec. 28, 2021

(54) ACCESS CONTROL SYSTEM AND METHOD

(71) Applicant: JPMorgan Chase Bank, N.A., New York, NY (US)

(72) Inventors: Rob Hydell, Ponte Vedra Beach, FL (US); Jason L. Young, Shelby Township, MI (US); Pavel Lobashov, Brooklyn, NY (US)

(73) Assignee: JPMORGAN CHASE BANK, N.A., New York, NY (US)

(*) Notice: Subject to any disclaimer, the term of this patent is extended or adjusted under 35 U.S.C. 154(b) by 251 days.

This patent is subject to a terminal disclaimer.

(21) Appl. No.: 16/448,278

(22) Filed: Jun. 21, 2019

(65) Prior Publication Data

US 2019/0312872 A1 Oct. 10, 2019

Related U.S. Application Data

(63) Continuation of application No. 14/970,743, filed on Dec. 16, 2015, now Pat. No. 10,375,071.

(51) Int. Cl.
*H04L 29/06* (2006.01)

(52) U.S. Cl.
CPC ............ *H04L 63/10* (2013.01); *H04L 63/101* (2013.01); *H04L 63/104* (2013.01); *H04L 63/20* (2013.01)

(58) Field of Classification Search
None
See application file for complete search history.

(56) References Cited

U.S. PATENT DOCUMENTS

| | | | | |
|---|---|---|---|---|
| 6,449,643 B1 * | 9/2002 | Hyndman | ............. | G06F 21/629 709/223 |
| 6,820,082 B1 * | 11/2004 | Cook | ................. | G06F 21/6227 707/754 |
| 7,194,538 B1 * | 3/2007 | Rabe | ..................... | G06F 3/0605 709/220 |
| 8,065,741 B1 | 11/2011 | Coblentz et al. | | |
| 2003/0191810 A1 * | 10/2003 | Muhlestein | ............. | H04L 63/10 709/215 |
| 2005/0060412 A1 | 3/2005 | Chebolu et al. | | |
| 2010/0325717 A1 | 12/2010 | Goel et al. | | |
| 2017/0118251 A1 * | 4/2017 | Roth | ...................... | G06F 3/011 |
| 2017/0180192 A1 | 6/2017 | Markowitz et al. | | |

* cited by examiner

*Primary Examiner* — Fatoumata Traore
(74) *Attorney, Agent, or Firm* — Greenblum & Bernstein, P.L.C.

(57) ABSTRACT

A system and method control or manage access to multiple target servers in a network. The system includes an access control user interface, a memory, and a management server. The access control user interface is accessible to the multiple target servers. The memory stores a database providing information to the access control user interface. The management server includes a processor implementing discovery and event trigger engines. The discovery engine discovers user rights stored at the multiple target servers and delivers the user rights over the network to the database. The event trigger engine is invoked by detection of a security event from a first target server, updates the user rights at a local cache on the first target server, and delivers the updated user rights to the database. The event trigger engine is configured to modify the discovery engine based on the detection of the security event.

20 Claims, 7 Drawing Sheets

ACCESS CONTROL SYSTEM AND METHOD

CROSS-REFERENCE TO RELATED APPLICATION

This application is a continuation of U.S. application Ser. No. 14/970,743 filed Dec. 16, 2015, pending, the entire disclosure of which including its specification, drawings, and claims, is incorporated herein by reference in its entirety.

FIELD OF THE INVENTION

Embodiments of the present invention are generally related to systems and methods for controlling access to server resources, and in particular for controlling access to Windows® Servers by increasing security and providing real time authorization updates and responses to security events.

BACKGROUND OF THE INVENTION

Access control involves authorizing users, groups, and computers to access resources on a network or computer. Resources may include, for example, servers, files, printers, or other peripheral devices. Before a user, group, computer, or other requestor can gain access to a resource, the requestor must identify itself to the security subsystem for the operating system. 111is identity is contained within an access token that is re-created every time a subject logs on. Before allowing the subject to access a resource, the system checks to determine whether the access token for the subject is authorized to access the object and complete the desired task. The system does this by comparing information in the access token with access control entries contained in an access control list for the resource.

Access control entries can allow or deny a number of different behaviors, depending on the type of object For example, available options on a file object can include "Read", "Write" and "Execute". On a printer, available access control entries can include "Print", "Manage printers", and "Manage documents". These access control entries define permission that relate to the scope of access granted to a user or group for a resource. For example, a finance group can be granted Read and "Write permissions for a file named Payroll.dat. Using an access control user interface, an authorized administrator can set permissions for resources. Permissions can be granted to any user, group, or computer. Common permissions for different types of resources include "read", "modify", "change owner", and "delete".

Upon receiving an access request, the system identifies the user and checks the access control list for the resource for access control entries that apply to the requestor (the user and the groups to which the user belongs). For identification purposes, the system may utilize the Security Account Manager (SAM), which is a database file that stores user passwords in Windows® based systems. SAM can be used to authenticate local and remote users. If the system comes to the end of the access control list and the desired access is still not explicitly allowed or denied, the system denies access to the requested resource.

Windows® Servers platforms rely on a distributed authorization model, with each operating system instance providing its own authorization and authentication services. While the use of local authentication on Windows® Servers may be restricted under IT risk policies, multiple exceptions exist due to technological or operational constraints. Additionally, in the event that the operating system is unable to associate with the domain and perform domain-based authentication, a local authentication mechanism enables fall-back for recovery and trouble-shooting purposes.

Local authorization is the only solution capable of providing flexible access controls in a large scale environment. However, a challenge with the local authorization model is the lack of a scalable administrative solution.

In a typical Windows® Server environment, access is granted by permanently adding an account or a directory based group into a privileged group, e.g. "administrators", for a local server to the access control list. The only offering is based on group policies, and supports policy level lock-ins with no effective exception handling. To support sufficient granularity, a policy-based solution would require creation of thousands of unique policy objects and would still result in a significant percentage of exceptions, effectively exempting those systems from the management structure.

Thus, in the policy based system, standing access with a high level of control is granted for these members of the privileged group on a continuous basis. Even when the directory-based model is used in combination with password vault solutions, such as Enterprise Password Vault (EPV), it grants each administrative account a scope of authority that is significantly higher than needed. Typically, one account or group is provisioned with rights for as many as thousands of Windows® Server systems. This method lacks flexibility and produces a model in which a group or multiple groups receive uniform and generally excessive access to the entire server population.

Alternatively, server systems may utilize a granular application of specific rights to each individual server in a system. This method is extremely labor intensive, spawns multiple inconsistencies, and leads to the creation of duplicative and unnecessary domain security groups. Additionally, unauthorized changes and the granting of requests for emergency access can create risks.

Furthermore, continuous monitoring of access rights is challenging, as implementing changes made locally on each Windows® server typically requires costly security monitoring software having heavy dependencies on hardware infrastructure. Various methods of managing on-demand access have been attempted. However, no known methods have been successful in providing on-demand access to server resources in systems having very large numbers of server systems and disjointed networking tiers.

Currently, no capability exists to lock down local SAM and local privileges from modification. In fact, such modifications can be made not only interactively, but also programmatically, for example, during software installations. Accordingly, in the absence of this capability, a solution is needed that will focus on providing periodic reconciliation of specific SAM properties and privileges, reporting changes in near real time, and providing the capability for updating local SAM and local privileges on demand.

Accordingly, a solution is needed that is scalable and secure and does not grant excessively high privileges across multiple servers when access is needed only for a limited number of servers. Furthermore, a solution is needed that modifies user rights in near real time to facilitate on-demand access changes to access controls.

SUMMARY OF THE INVENTION

The present invention fulfills long-felt needs by providing a method and system for managing access to multiple target servers connected over a network while minimizing client side labor as well as security risks.

In one aspect of the invention, an access control system is provided for controlling access to multiple target servers in a networked environment. The access control system includes an access control user interface accessible to the target servers and a computer memory storing an access control database providing information to the access control user interface. The access control system additionally includes a management server including an access control processor. The access control processor implements a discovery engine for discovering user rights stored at the target server and delivering the user rights stored at the target server over the network to the access control database. The access control processor further implements an event trigger engine invoked by a security event from at least one of the target servers, the event trigger engine updating the user rights stored at the target server and delivering the updated rights to the access control database. Additionally, the access control processor implements a client action trigger engine invoked via a local agent stored at the management server, the client action trigger engine collecting the updated rights, providing a notification through the access control user interface of a required action to the target server, and updating the access control database with the required action.

In an additional aspect of the invention, a method is provided for managing access to multiple target servers in a networked environment. The method includes providing an access control user interface accessible to the target servers and storing, in a computer memory, an access control database providing information to the access control user interface. The method additionally includes utilizing an access control processor stored at a management server for performing steps including, (1) discovering user rights stored at the target servers and delivering the user rights stored at the target servers over the network to the access control database; (2) invoking an event trigger engine based on a security event from at least one of the target servers, the event trigger engine updating the user rights stored at the target server and delivering the updated rights to the access control database; and (3) invoking a client action trigger engine via a local agent stored at the management server, the client action trigger engine collecting the updated rights, providing a notification through the access control user interface of a required action to the target server, and updating the access control database with the required action.

Upon successful implementation of the features as set forth above, on-demand modifications and corrections to a baseline of each target server are enabled.

BRIEF DESCRIPTION OF THE DRAWINGS

In order to facilitate a fuller understanding of the present invention, reference is now made to the accompanying drawings, in which like elements are referenced with like numerals. These drawings should not be construed as limiting the present invention, but are intended to be exemplary only.

DETAILED DESCRIPTION OF THE INVENTION

Embodiments of invention provide a method and system for controlling access to server resources including for example files, processes, printers, or any other resources stored on a server or existing within a network accessible to the server. In particular, embodiments improve current access control models, particularly for Windows® Servers, to enable highly flexible application of user access and user privileges down to each individual server. The solution provides an agent-based discovery and notification model that captures critical data points of a local authentication or authorization repository, provides back-end reporting with approval logic, and the capability to execute a change or correction of the local repository in near real time.

A goal of the system is to provide an environment in which operational controls are restricted to individuals and/or functional accounts specifically aligned with recurring activities on targeted servers, while enabling on-demand, time-limited privileged access for troubleshooting and other appropriate purposes. In embodiments of the invention, a self-service interface is provided for requestors, while ultimate responsibility for security remains with resource owners and their information technology counterparts. However, through the self-service solution, the system gathers data, maintains a current baseline, and identifies divergence from a pre-defined baseline. The collected data also forms an audit trail that is utilized for system wide reporting on potential risks within the server infrastructure.

The solution has a two-tier web services based back-end to provide capability to add or remove specific accounts or directory-based groups to and from local privileged groups in near real time, thereby providing granular control over the scope of administration and exposing the capability via a self-service user interface. The system leverages the capabilities of existing components, e.g. Microsoft System Center Operations Manager (SCOM), by utilizing its features to deliver payload, trigger an action based on local security and audit events or a call via its infrastructure APIs. The system establishes a centralized management capability for the local server account database (SAM), facilitating both gathering of current state information and any modifications to the local SAM for critical items, as well as on-demand injection of additional security principals into the local SAM for either temporary or permanent access.

Figure 1:
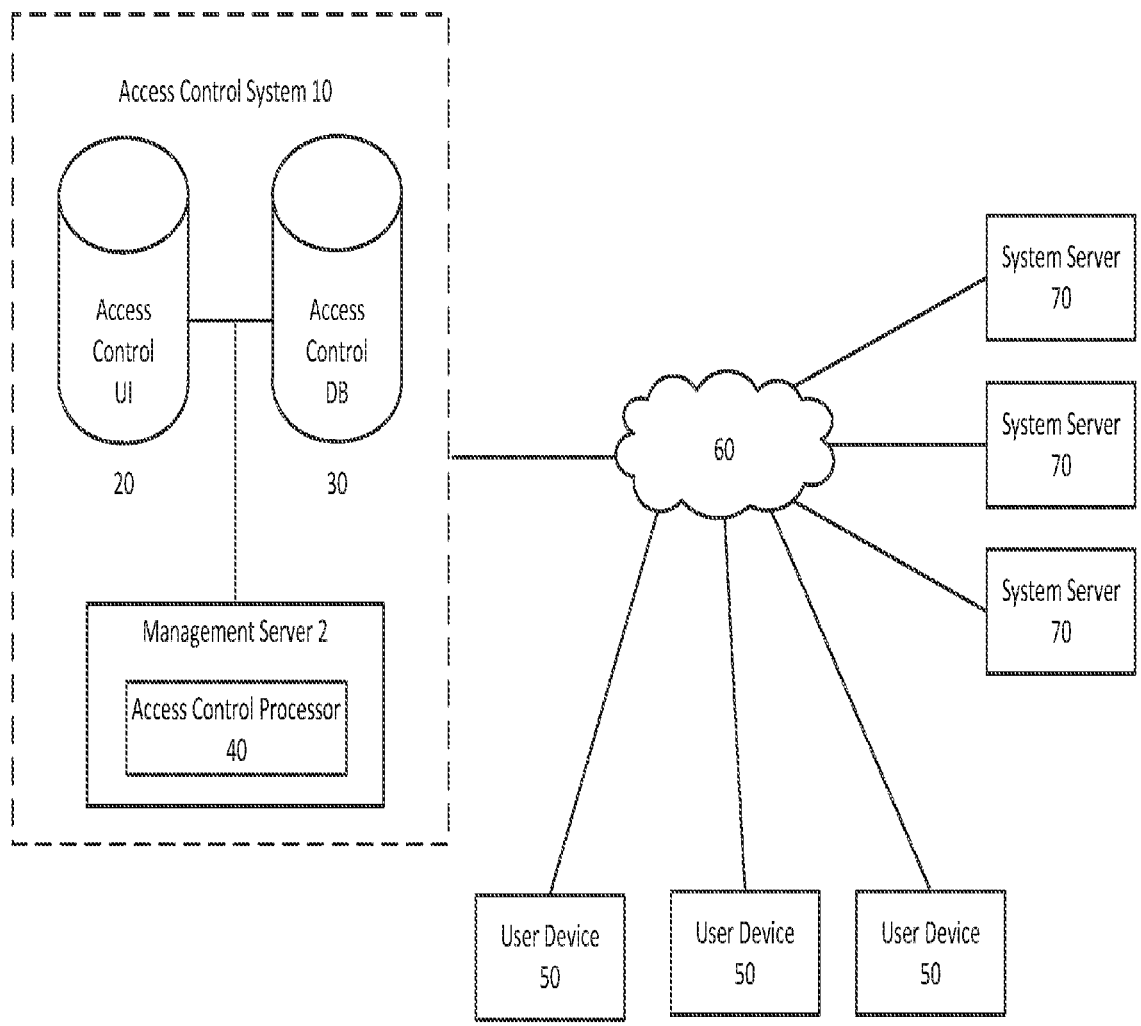
FIG. 1 is a block diagram illustrating an exemplary operating environment for an access control system in accordance with an embodiment of the invention.

FIG. 1 is a block diagram illustrating a high level overview of an exemplary operating environment for an access control system 10 in accordance with an embodiment of the invention. An access control system 10 may include an access control UI 20, an access control database 30, and an access control processor 40. In embodiment of the invention, the access control processor may operate on a management server 2 that includes one or more computing systems including one or more computer processors and computer memories connected over a network 60 with system servers 70 and user devices 50.

The management server 2 is external to the target servers and includes at least one computing device and data storage area. The management server 2 may be utilized for triggering of the access control processor 40 for reconciling local access controls for each target server with those collected by the access control processor 40, as will be further described below. In embodiments of the invention, the access control processor 40 may be executed on the target servers 70 rather than through the management server 2.

The access control system 10 is illustrated as including the access control user interface (UI) 20, the access control database 30, and the access control processor 40. In operation, and as well be further described herein, the access control processor 40 interacts with both the access control database 30 and the target servers 70 in order to update local SAM and privileges of the target servers 70 through the provision of near real time notifications of changes in the local access records.

The UI 20 may be deployed centrally as a single logical instance with multi-site availability to the target servers 70 over the network 60. The UI 20 handles validation of the requestor's rights to view or update the target server's access control model. The configuration of the UI 20 enables the requestor to perform many adjustments for the purpose of access control. For example, the requestor may configure a preferred baseline, apply an existing baseline, set unique per-server overrides, accept detected changes into the baseline, and override changes with settings in the baseline. The requestor may be any individual identified as serving a specific support role associated with the target server 70, wherein the individuals associated with the support role are allowed to request specific access in conjunction with an approved internal change control action or service ticket.

The UI 20 further provides the capability to inject a domain account or group into a local security group on a temporary basis or to or to inject a domain account or group or local account or group into a privilege list on a temporary basis. Thus, the UI 20 allows the requestor to insert time limitations on additional access privileges.

The UI 20 may further provide basic approval flow for critical changes to ensure that a persistent policy change cannot be made unilaterally. For example, the UI 20 may require a resource owner or predetermined administrator to validate the change proposal.

The UI 20 further provides a mechanism to trigger execution of a request to an agent, e.g., SCOM, via a software development kit (SDK) application program interface (API).

The access control database 30 may serve as back-end to the UI 20 and may be based on a SQL server platform with two primary interfaces including the aforementioned UI and a geo-resilient web services interface. The data collection from the agents and policy retrievals by the agents may utilize the geo-resilient web services interface. The access control database 30 may be stored in and accessible from a computer memory or data storage structure capable of storing large amounts of data. For example, the data storage areas may include HP 3PAR StoreServ® Storage systems. Those of ordinary skill in the art will appreciate that other computer storage systems for storing large amounts of data may be implemented and that data stored in the data storage areas may be managed and communicated with an Object-Relational Database Management System or other type of system.

The access control processor 40 includes a computer processor utilizing multiple engines as well as a pre-existing agent to achieve the stated access control goals. While the agent is described herein as SCOM, those skilled in the art will understand and appreciate that other agents, including agents that may be later developed, having the capabilities of SCOM, are within the scope of the invention. The access control processor 40 will be discussed in greater detail below with respect to FIGS. 2-5.

The network 60 is preferably the Internet, but may be or include other types of networks. Furthermore, even though only one network is shown, multiple networks may be used. The network 60 may include a wired or wireless local area network (LAN) and a wide area network (WAN), wireless personal area network (PAN) and other types of networks. Computers may be connected over the Internet, an Intranet, Extranet, Ethernet, or any other system that provides communications. Some suitable communications protocols may include TCP/IP, UDP, or OSI for example. For wireless communications, communications protocols may include Bluetooth, Zigbee, IrDa or other suitable protocol. Furthermore, components of the system may communicate through a combination of wired or wireless paths.

The target servers 70 may be or include computing systems that may be operated by a line of business, by consultants, or by resource managers within a corporation. The target servers 70 may include at least one processor and multiple applications executed by the processor capable of performing desired functions to interact with the management server 2 and the other servers and resources on the network or within multiple networks within the scope of the overall system. The target servers 70 and server resources include any resources available within the networked environment, such as servers, files, processes, applications, peripherals, and other resources. These resources may be or include applications running on a large number of servers or stored in databases in storage areas within the system.

The target servers 70 may each include a directory or a location for storing the local SAM and user privileges. As set forth above, the local SAM and user privileges are readily modifiable at a granular level. The access control system 10 ensures that modifications to the local SAM and user privileges are communicated promptly with respect to the target servers 70. The target servers 70 may include mainframe computers, personal computers, desktop or laptop computing systems, mobile devices and the like.

The user devices 50 may include computing systems adapted to request resources from the target servers 70 over the network 60. The user devices 50 may include a browser for accessing information provided by connected target servers 70 that offer such functionality over the Internet or any other network. The user devices 50 may include mainframe computers, personal computers, desktop or laptop computing systems and the like. The user devices 50 may additionally be or include mobile systems, such as smart phones, tablets, or other portable computing apparatus. The mobile devices may include handheld devices including mobile smartphones, such as Android® phones and iPhones®, tablets, or hand-held wireless devices such as PDAs, multiprocessor systems, microprocessor-based or programmable consumer electronics, minicomputers, other handheld devices that may now be available or may in the future become available.

The user devices 50*a* . . . 50*c* may include mobile devices owned and issued by the organization operating the access control system 10. Mobile user devices may execute downloadable applications for operating in conjunction with connected servers. The downloadable applications may be stored in a memory of the user devices 50 and executed by processors on the mobile systems.

Figure 2:
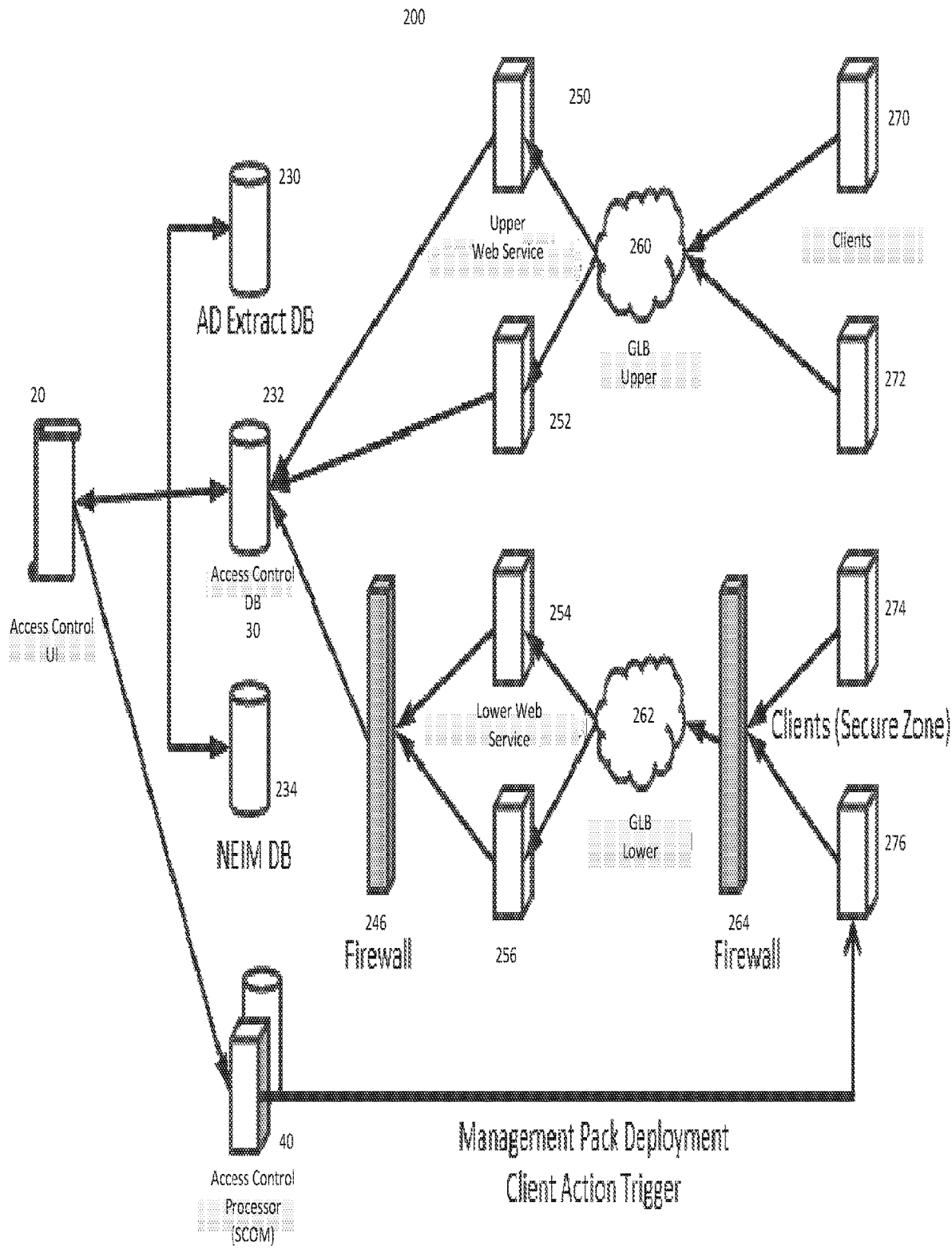
FIG. 2 is a block diagram illustrating computer architecture for implementation of the access control system in accordance with an embodiment of the present invention.

FIG. 2 is a block diagram illustrating technology architecture for implementation of the access control system 10 in accordance with an embodiment of the present invention. As described with reference to FIG. 1, the system includes an access control UI 20 and an access control database 30. The access control processor of FIG. 1 is implemented through the agent (SCOM) 40.

Client systems 270, 272, 274, and 276 include a target server, an operating system instance, a local account database (SAM) and any rights and privileges defined in the SAM. Clients 274 and 276, located in the secure zone access web services interfaces 254 and 256 hosted on a virtual machine 256 front ended by a load balancing system, Global Load Balancer (GLB) 262. The clients 274 and 276 in the secure zone reach the access control systems through firewalls 246 and 264. Clients 270 and 272 access the upper web service interfaces 250 and 252 front ended by load balancing solution 260. The upper clients 270 and 272 represent the implementation of the solution in a single network zone and the lower clients 274 and 276 implement the solution in a compartmentalized network with tiered access.

The system utilizes existing components, such as an AD extract database 230, a non-employee identities (NEIM) database 234, and an agent (SCOM) 240 to fully implement the solution. The AD extract database 230 and the NEIM database 234 serve as reference points to augment the data gathered by the access control database 30 from the individual target servers so that the data can be presented as a comprehensive end-to-end access model view through the access control UI 220. The agent 240 receives data from the access control database 30, updates, the access control database 30, and also updates the clients 270, 272, 274, and 276 through the access control UI 20.

Figure 3:
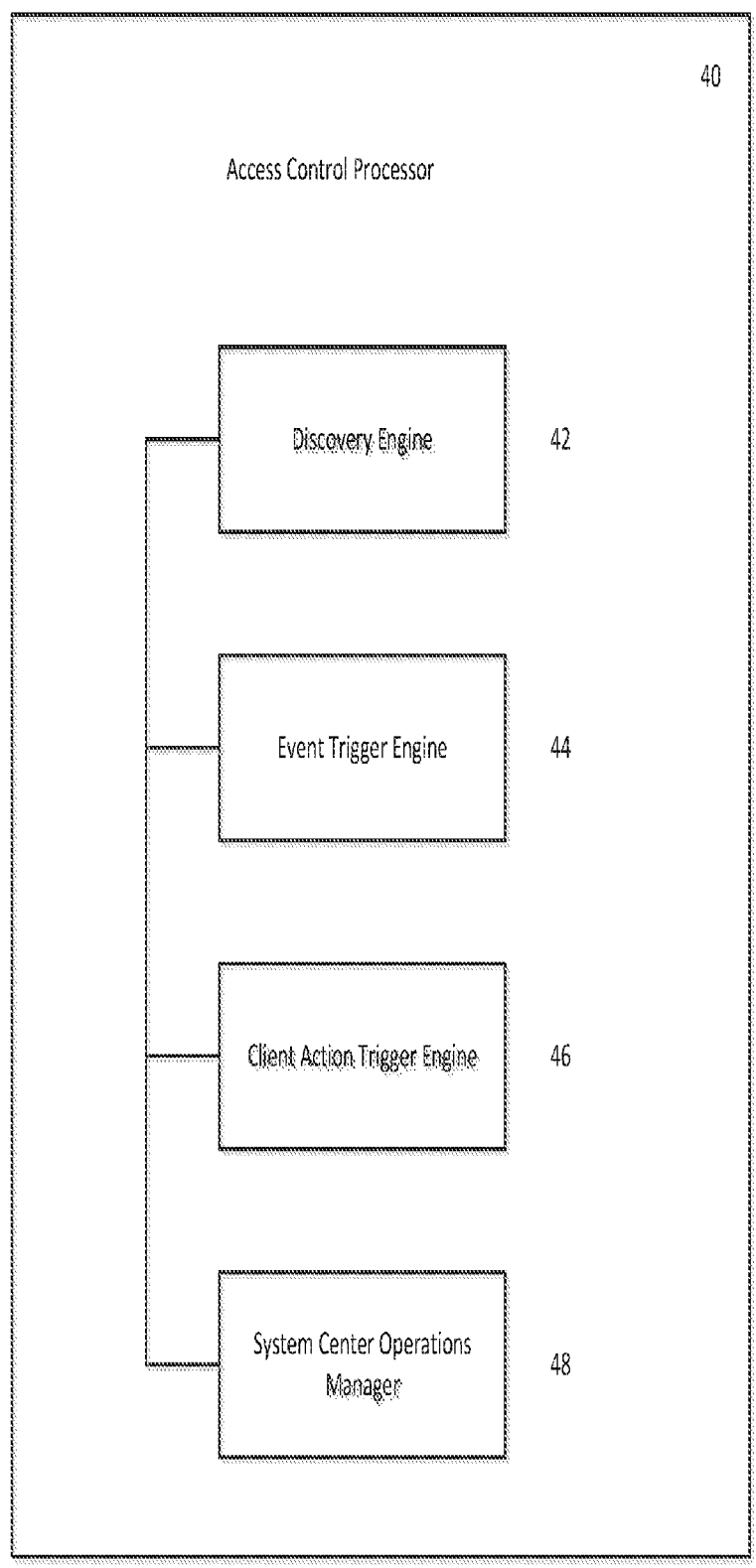
FIG. 3 is a block diagram illustrating an access control processor in accordance with an embodiment of the present invention.

FIG. 3 is a block diagram illustrating components of the access control processor 40 in accordance with an embodiment of the invention. The access control processor 40 includes a discovery engine 42, an event trigger engine 44, a client action trigger engine 46, and an agent 48 (SCOM). The discovery engine 42, event trigger engine 44, and client action trigger engine 46 may be embedded to create a custom SCOM management pack deployed at a management server housing the access control processor 40. The agent 48 is then utilized to impact the target servers, thus guaranteeing controlled and secure delivery of the functionality to each target server. The discovery engine 42 determines client rights by consulting the local SAM at the target server and collecting local cached data and data uploaded to the access control database. The discovery engine 42 further performs enforcement of the discovered local policies. The discovery engine 42 captures each change that occurs locally to each target server, for example by direct manipulation of a local SAM. The discovery engine 42 forwards the changes to the access control processor for communication with the access control database and access control UI. When necessary, depending on the rules configured for the specific change that has taken place, the system triggers a notification workflow, which may include approval or rejection, a ticket or an alert, or an immediate action to revert the change. In embodiments of the invention, the discovery engine 42 may run at regular intervals, for example at hourly intervals or multiple times per day. Alternatively, the discovery engine 42 may run continuously. The discovery engine 42 updates the access control database with its discovered rights information.

The event trigger engine 44 is invoked by detection of new security events, such as a request to add a user or group to a list of privileged groups. The event trigger engine utilizes event details to identify changes in security settings. Upon identification of changes, the event trigger engine 44 updates a local cache and uploads changes to the to the access control database. For security event triggers, any changes to the attributes specified above are gathered and forwarded by the event trigger engine 44 to the access control database. Each event may also include: (1) time created; (2) SubjectUserSID (Reduced to RID for local accounts); (3) SubjectUserName; and (4) SubjectDomainName.

The client action trigger engine 46 is invoked via the SCOM API at the management server. The client action trigger engine 46 obtains details of required action from the access control database and implements the action with respect to the client to provide notification through the access control UI and further updates the access control database with the current status. An example of a required action includes changing a local SAM database to insert a domain account to a local group, thus providing access, or removing a domain account from the local group, thus revoking access, in order change user rights assignment by adding local or domain-based users or groups. The client action trigger engine 46 determines the required action in response to a request, such as a request to grant privileged access for the duration of a change event or to revoke access at the expiration of a change event when the access is no longer required. A separate geo-resilient instance of web services interface may be deployed on segments with the appropriate internal process for obtaining authorized access between network zones through a firewall device to ensure open communication channels from all clients in secure zones, and from the web services hosts to the back-end SQL repository.

Client-side logic is to be carried out by one or more PowerShell script, which in turn will be deployed and triggered by SCOM. The following functionality and triggering mechanisms should be supported by the SCOM management pack including the above described engines:

- Automatic suppression of actions on domain controllers
- No suppression for SCOM management pack workflows during custom maintenance mode.
- Security Event subscription for changes to local SAM.
- Security Event subscription for changes to user rights assignment policy.
- Periodic scheduled rediscovery of SAM/user rights policy information (24-72 hrs).
- Agent Task in SCOM console/SDK.

The SCOM management pack includes the engines described above and a packaged set of rules defining events to be monitored and actions taken in response to such events. In embodiments of the invention, one management pack may support one product on a target server and thus many management packs are deployed. The above-described engines aim to achieve the lowest practical overhead on the target server, and avoid causing any communication to the domain infrastructure as part of discovery. Instead, the engines rely on information available locally to the system, such as raw SID data for domain-based accounts and other foreign security principals, and reconcile it with the rest of directory object attributes at the back-end.

While SCOM 48 is an existing component, the additional engines of the access control processor utilize SCOM 48 for its notification capability. SCOM is a cross-platform data center management system for operating systems that uses a single interface to show state, health, and performance information on computing systems. It also provides alerts generated according to availability, performance, configuration, or security situations identified. Thus, in addition to the notifications provided through the access control UI, SCOM is able to trigger notifications of security events, changes in access rules, or other events through emails or pager messages and may further trigger workflow intended to correct the cause of alerts in a particular manner. For example, SCOM may generate a message requiring resource owner approval for temporary authorization access. The SCOM infrastructure provides a security framework, payload delivery and execution, network tier traversal via existing proxy-like gateways, and notification capabilities. The customization provided by the invention focuses on real time access control components through the use of SCOM.

Thus, initial deployment of the access control system may focus on discovering a baseline of each managed server's security model using the discovery engine 42, and subsequently substituting and enhancing periodic scheduled scans with event based updates using the event trigger engine 44. Once the updates are implemented, a loop-back delivered via SCOM triggered action will enable on-demand modifications and corrections to the monitored server's baseline.

Figure 4:
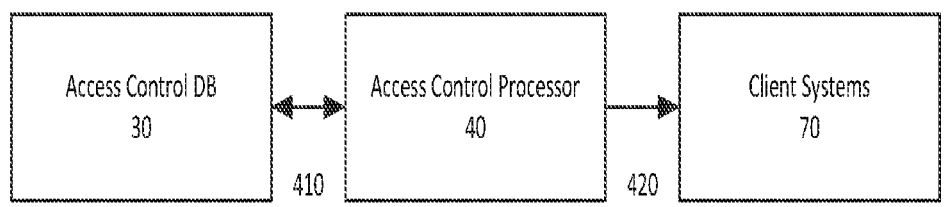
FIG. 4 is a flow diagram illustrating an implementation method of the access control system in accordance with an embodiment of the present invention.

FIG. 4 is a flow diagram illustrating flow between the access control processor 40 in accordance with embodiments of the invention. As set forth above, the access control processor 40 utilizes the capabilities of SCOM to provide notifications at 420 to client systems 270. The access control processor 40 also utilizes the discovery engine 42, the event trigger engine 44 and the client action trigger script 46 to update the access control database 30.

Figure 5:
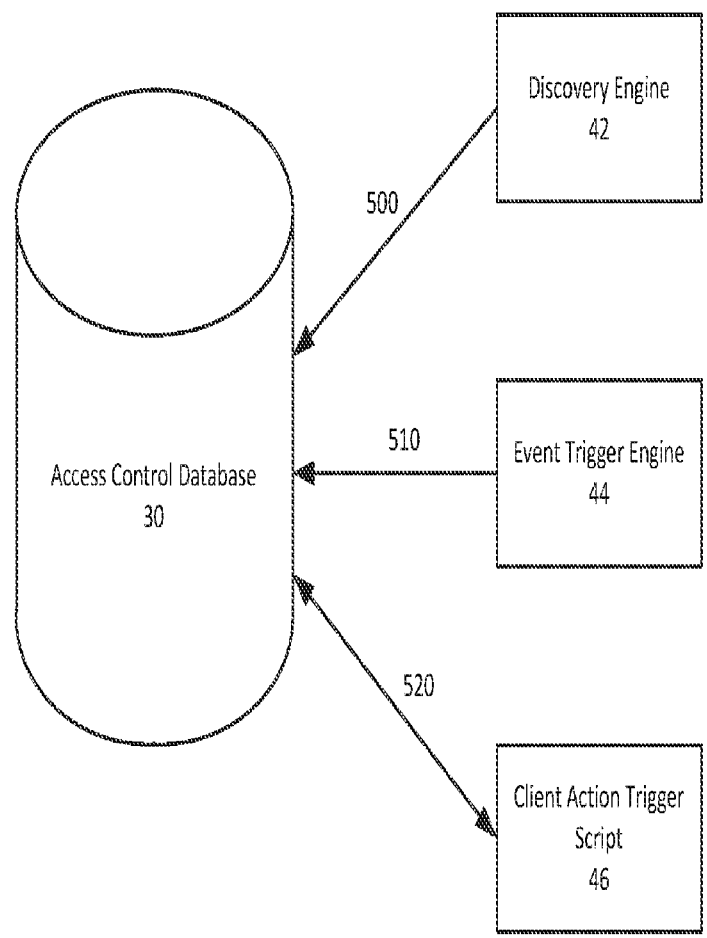
FIG. 5 is a flow diagram illustrating updating of the access control database in accordance with an embodiment of the invention.

FIG. 5 is a flow diagram illustrating the flow between the engines of the access control processor 40 and the access control database 30. The discovery engine 42 runs discovery processes and sends updates at 500 to the access control database 30. The event trigger engine 44 also serves to update the access control database 30 at 510 based on collected security events. Finally, the client action trigger engine 46 also sends updates to the access control database 30 and further receives updates from the access control database 30 and utilizes SCOM to send notifications based on these updates.

Figure 6:
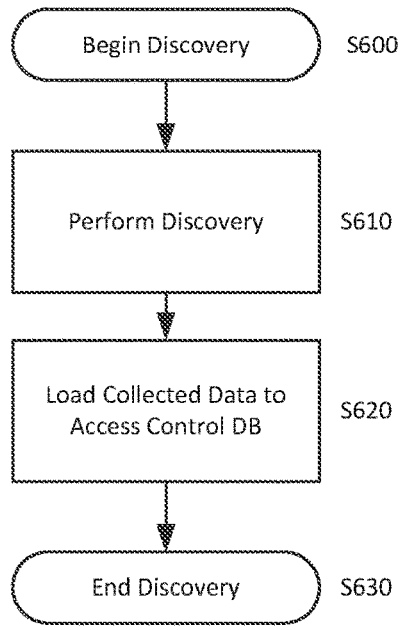
FIG. 6 is a flow chart illustrating a discovery process in accordance with an embodiment of the present invention.

FIG. 6 is a flowchart illustrating the discovery process in accordance with an embodiment of the invention. The discovery process begins in S600 and the discovery engine performs discovery in S610. The discovery engine loads discovered data from the local SAM and stored privileges in the access control database in S620. The process ends in S630. As set forth above, the discovery process may run at scheduled intervals or may, in embodiments of the invention, run continuously.

Figure 7:
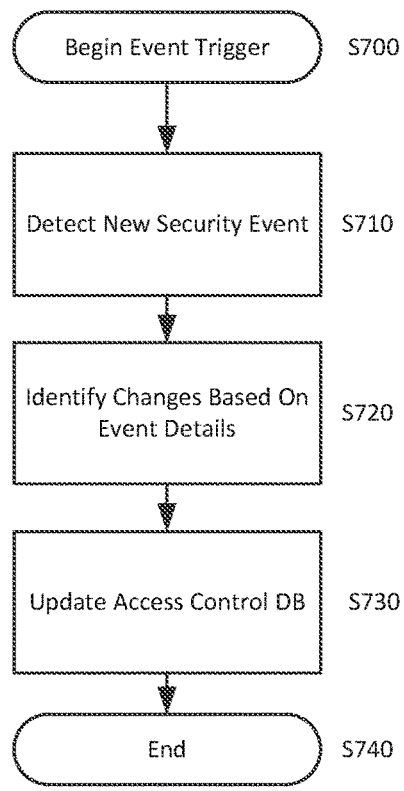
FIG. 7 is a flow chart illustrating an event trigger process in accordance with an embodiment of the present invention.

FIG. 7. is a flowchart illustrating an event trigger process in accordance with an embodiment of the invention. The process begins in S700 and the event trigger engine detects a new security event in S710. In S720, the event trigger engine identifies changes based on event details. In S730, the event trigger engine updates the access control database and the process ends in S740. Depending on the frequency of events, the event trigger process may substantially replace the discovery process or cause it to run less frequently once the solution is implemented.

Figure 8:
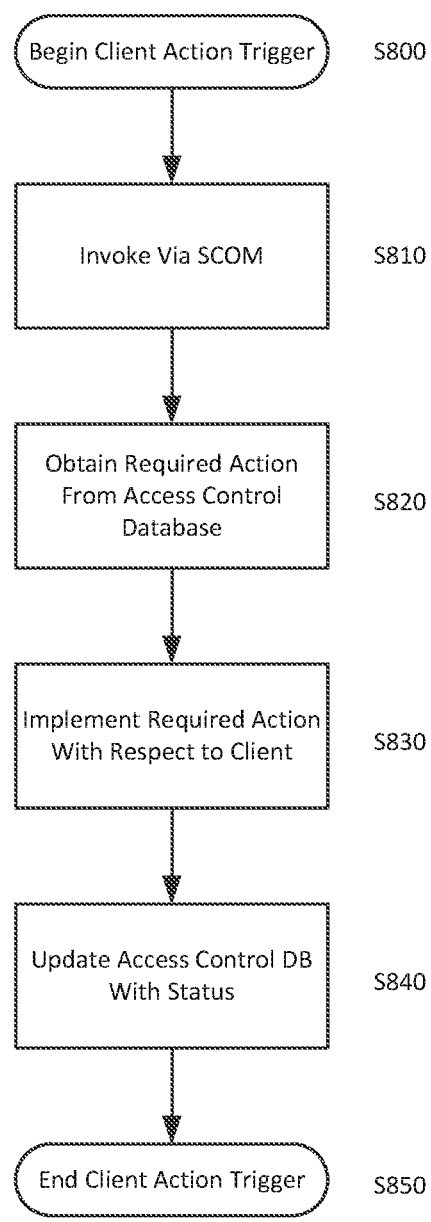
FIG. 8 is a flow chart illustrating a client action trigger in accordance with an embodiment of the present invention.

FIG. 8 is a flowchart illustrating the client action trigger process in accordance with an embodiment of the invention. The process begins in S800 and client action trigger is invoked via SCOM in S810. In S820, the client action trigger engine obtains required action from the access control database. In S830, the client action trigger engine implements the required action with respect to the client. In S840, the client action trigger updates the access control database with status. As set forth above, SCOM provides the notification to the client. The client action trigger process ends in S850.

Generally, it should be noted that the components depicted and described herein above may be, or include, a computer or multiple computers. Although the components are shown as discrete units, all components may be interconnected or combined. The components may be described in the general context of computer-executable instructions, such as program modules, being executed by a computer. Generally, program modules include routines, programs, objects, components, data structures, etc., that perform particular tasks or implement particular abstract data types.

Those skilled in the art will appreciate that the invention may be practiced with various computer system configurations, including hand-held wireless devices such as mobile phones or PDAs, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote computer storage media including memory storage devices.

Computers typically include a variety of computer readable media that can form part of the system memory and be read by the processing unit. By way of example, and not limitation, computer readable media may comprise computer storage media and communication media. The system memory may include computer storage media in the form of volatile and/or nonvolatile memory such as read only memory (ROM) and random access memory (RAM). A basic input/output system (BIOS), containing the basic routines that help to transfer information between elements, such as during start-up, is typically stored in ROM. RAM typically contains data and/or program modules that are immediately accessible to and/or presently being operated on by a processing unit. The data or program modules may include an operating system, application programs, other program modules, and program data. The operating system may be or include a variety of operating systems such as Microsoft Windows®® operating system, the Unix operating system, the Linux operating system, the Xenix operating system, the IBM AIX™ operating system, the Hewlett Packard UX™ operating system, the Novell Netware™ operating system, the Sun Microsystems Solaris™ operating system, the OS/2™ operating system, the BeOS™ operating system, the MacintoshM® operating system, the Apache™ operating system, an OpenStep™ operating system or another operating system of platform.

At minimum, the memory includes at least one set of instructions that are either permanently or temporarily stored. The processor executes the instructions that are stored in order to process data. The set of instructions may include various instructions that perform a particular task or tasks, such as those shown in the appended flowcharts. Such a set of instructions for performing a particular task may be characterized as a program, software program, software, engine, module, component, mechanism, or tool. A computer may include a plurality of software processing modules stored in a memory as described above and executed on a processor in the manner described herein. The program modules may be in the form of any suitable programming language, which is converted to machine language or object code to allow the processor or processors to read the instructions. That is, written lines of programming code or source code, in a particular programming language, may be converted to machine language using a compiler, assembler, or interpreter. The machine language may be binary coded machine instructions specific to a particular computer.

Any suitable programming language may be used in accordance with the various embodiments of the invention. Illustratively, the programming language used may include assembly language, Ada, APL, Basic, C, C++, COBOL, dBase, Forth, FORTRAN, Java, Modula-2, Pascal, Prolog, REXX, and/or JavaScript for example. Further, it is not necessary that a single type of instruction or programming language be utilized in conjunction with the operation of the system and method of the invention. Rather, any number of different programming languages may be utilized as is necessary or desirable.

In addition, the instructions and/or data used in the practice of the invention may utilize any compression or encryption technique or algorithm, as may be desired. An encryption module might be used to encrypt data. Further, files or other data may be decrypted using a suitable decryption module.

The computing environment may also include other removable/nonremovable, volatile/nonvolatile computer storage media. For example, a hard disk drive may read or write to nonremovable, nonvolatile magnetic media. A magnetic disk drive may read from or write to a removable, nonvolatile magnetic disk, and an optical disk drive may read from or write to a removable, nonvolatile optical disk such as a CD ROM or other optical media. Other removable/nonremovable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The storage media is typically connected to the system bus through a removable or non-removable memory interface.

The processing unit that executes commands and instructions may be a general purpose computer, but may utilize any of a wide variety of other technologies including a special purpose computer, a microcomputer, mini-computer, mainframe computer, programmed micro-processor, micro-controller, peripheral integrated circuit element, a CSIC (Customer Specific Integrated Circuit), ASIC (Application Specific Integrated Circuit), a logic circuit, a digital signal processor, a programmable logic device such as an FPGA (Field Programmable Gate Array), PLD (Programmable Logic Device), PLA (Programmable Logic Array), RFID processor, smart chip, or any other device or arrangement of devices capable of implementing the steps of the processes of the invention.

It should be appreciated that the processors and/or memories of the computer system need not be physically in the same location. Each of the processors and each of the memories used by the computer system may be in geographically distinct locations and be connected so as to communicate with each other in any suitable manner. Additionally, it is appreciated that each of the processors and/or memories may be composed of different physical pieces of equipment.

A user may enter commands and information into the computer through a user interface that includes input devices such as a keyboard and pointing device, commonly referred to as a mouse, trackball or touch pad. Other input devices may include a microphone, joystick, game pad, satellite dish, scanner, voice recognition device, keyboard, touch screen, toggle switch, pushbutton, or the like. These and other input devices are often connected to the processing unit through a user input interface that is coupled to the system bus, but may be connected by other interface and bus structures, such as a parallel port, game port or a universal serial bus (USB).

One or more monitors or display devices may also be connected to the system bus via an interface. In addition to display devices, computers may also include other peripheral output devices, which may be connected through an output peripheral interface. The computers implementing the invention may operate in a networked environment using logical connections to one or more remote computers, the remote computers typically including many or all of the elements described above.

Various networks may be implemented in accordance with embodiments of the invention, including a wired or wireless local area network (LAN) and a wide area network (WAN), wireless personal area network (PAN) and other types of networks. When used in a LAN networking environment, computers may be connected to the LAN through a network interface or adapter. When used in a WAN networking environment, computers typically include a modem or other communication mechanism. Modems may be internal or external, and may be connected to the system bus via the user-input interface, or other appropriate mechanism. Computers may be connected over the Internet, an Intranet, Extranet, Ethernet, or any other system that provides communications. Some suitable communication protocols may include TCP/IP, UDP, or OSI, for example. For wireless communications, communications protocols may include Bluetooth, Zigbee, IrDa or other suitable protocol. Furthermore, components of the system may communicate through a combination of wired or wireless paths.

Although many other internal components of the computer are not shown, those of ordinary skill in the art will appreciate that such components and the interconnections are well known. Accordingly, additional details concerning the internal construction of the computer need not be disclosed in connection with the present invention.

Thus, embodiments of the invention establish an agent-based discovery and notification model that captures critical data points of a local authentication/authorization repository, provides back-end reporting with approval logic, and the capability to execute a change or correction of the local repository in near real time. Accordingly, the system as defined herein improves target server security by utilizing an access control engine for discovery and notification by leveraging an existing agent with notification capabilities.

It should also be readily apparent to one of ordinary skill in the art that the presently disclosed invention may be implemented in a wide range of industries. The various embodiments and features of the presently disclosed invention may be used in any combination, as the combination of these embodiments and features are well within the scope of the invention. While the foregoing description includes many details and specificities, it is to be understood that these have been included for purposes of explanation only, and are not to be interpreted as limitations of the present invention. It will be apparent to those skilled in the art that other modifications to the embodiments described above can be made without departing from the spirit and scope of the invention. Accordingly, such modifications are considered within the scope of the invention as intended to be encompassed by the following claims and their legal equivalent.

From the foregoing, it will be seen that this invention is one well adapted to attain all the ends and objects set forth above, together with other advantages, which are obvious and inherent to the system and method. It will be understood that certain features and sub-combinations are of utility and may be employed without reference to other features and sub-combinations. This is contemplated and within the scope of the appended claims.

What is claimed is:

1. An access control computing system for controlling access to multiple target servers in a networked environment, the access control computing system comprising:
   an access control user interface accessible to the multiple target servers;
   a computer memory storing an access control database providing information to the access control user interface; and
   a management server including an access control processor, the access control processor implementing:
      a discovery engine for discovering user rights stored at the multiple target servers and delivering the user rights stored at the multiple target servers over the network to the access control database; and
      an event trigger engine invoked by detection of a security event from a first target server, the event trigger engine updating the user rights at a local cache on the first target server and delivering the updated user rights to the access control database, wherein the event trigger engine is configured to modify the discovery engine based on the detection of the security event,
   wherein a local agent comprising a System Center Operations Manager invokes a client action trigger engine stored at the management server, provides a notification through the access control user interface of a required action to the first target server, and updates the access control database with the required action.

2. The system of claim 1, wherein the client action trigger engine utilizes notification capabilities of the System Center Operations Manager.

3. The system of claim 1, wherein notifications of a required action are provided through the access control user interface to the first target server and are provided to the access control user interface in near real time.

4. The system of claim 1, wherein the access control user interface is a self-service interface available at the multiple target servers.

5. The system of claim 4, wherein the self-service user interface provides the capability to add or remove groups from and to a list of locally stored privileged groups.

6. The system of claim 1, wherein the discovery engine discovers user rights stored at a local Security Account Manager of each target server.

7. The system of claim 6, wherein the discovery engine performs enforcement of local audit policies stored on at least one of the multiple target servers.

8. The system of claim 1, wherein the event trigger engine utilizes details of the request to add or delete a user or group to a list of privileged groups to identify a change, updates a local Security Account Manager with the change, and uploads the change to the access control database.

9. The system of claim 1, further comprising four web service interfaces hosted on virtual machines for connecting the multiple target servers to the access control database.

10. The system of claim 9, further comprising performing load balancing between the multiple target servers and the four web service interfaces.

11. A method for managing access to multiple target servers in a networked environment, the method comprising:
   providing an access control user interface accessible to the multiple target servers;
   storing, in a computer memory, an access control database providing information to the access control user interface; and
   utilizing an access control processor stored at a management server for performing steps including:
      discovering with a discovery engine user rights stored at the multiple target servers and delivering the user rights stored at the multiple target servers over the network to the access control database;
      invoking an event trigger engine based on a detected security event from at least a first target server, the event trigger engine updating the user rights at a local cache on the first target server and delivering the updated user rights to the access control database, wherein the event trigger engine is configured to modify the discovery engine based on the detection of the security event; and
      implementing a System Center Operations Manager (SCOM) as a local agent invoking a client action trigger engine stored at the management server, providing a notification through the access control user interface of a required action to the first target server, and updating the access control database with the required action.

12. The method of claim 11, further comprising utilizing notification capabilities of the System Center Operations Manager to provide notifications through the client action trigger engine.

13. The method of claim 11, further comprising providing notifications of a required action through the access control user interface to the first target server and providing the notifications to the access control user interface in near real time.

14. The method of claim 11, further comprising providing the access control user interface as a self-service interface available at the multiple target servers.

15. The method of claim 14, further comprising providing, through the self-service interface, the capability to add or remove groups from and to a list of locally stored privileged groups.

16. The method of claim 11, further comprising discovering, with the discovery engine, user rights stored at a local Security Account Manager of the first target server.

17. The method of claim 16, further comprising performing enforcement of local audit policies stored at the target server via the discovery engine.

18. The method of claim 11, further comprising utilizing the event trigger engine to identify a change, update a local Security Account Manager with the change, and upload the change to the access control database.

19. The method of claim 11, further comprising providing four web service interfaces hosted on virtual machines for connecting the multiple target servers to the access control database.

20. The system of claim 19, further comprising performing load balancing between the multiple target servers and the four web service interfaces.

* * * * *